United States Patent [19]

Pinot

[11] 3,904,150

[45] Sept. 9, 1975

[54] CASSETTE TAPE RECORDER

[75] Inventor: Pierre Pinot, Saint Germain Les Arpajon, France

[73] Assignee: Societe de Fabrication d'Instruments de Mesure S.F.I.M., Massy, France

[22] Filed: Mar. 16, 1973

[21] Appl. No.: 338,714

[30] Foreign Application Priority Data

Mar. 15, 1972 France .............................. 72.09060

[52] U.S. Cl. .............................................. 242/199

[51] Int. Cl. .. G03b 1/04; G11b 15/32; G11b 23/04

[58] Field of Search ............................ 242/197–200; 274/4 C, 11 C; 179/100.2 Z

[56] References Cited

UNITED STATES PATENTS

| | | | |
|---|---|---|---|
| 2,941,741 | 6/1960 | Bilsback | 242/198 X |
| 2,943,805 | 7/1960 | Loewe | 242/198 |
| 3,059,871 | 10/1962 | Loewe | 242/198 |
| 3,373,951 | 3/1968 | Mazoyer | 242/200 |

*Primary Examiner*—Leonard D. Christian
*Attorney, Agent, or Firm*—Alan H. Levine

[57] ABSTRACT

A magnetic tape recorder cassette has a captive cover permanently connected to the cassette so that it can be moved from a closed position, covering a front edge which has an opening in it to an open position, in which it covers the rear edge but allows the cassette to be inserted in the recorder. For each spool the cassette has a brake unit arranged to be retracted, when the cassette is inserted in the recorder. The recorder is reversible and drives a tape tensioning device comprising a freewheel and a slipping clutch for each spool, arranged to tend to wind up tape irrespective of the direction of travel of the tape, slipping of one or each clutch allowing the tape to travel while maintaining it taut.

4 Claims, 10 Drawing Figures

CASSETTE TAPE RECORDER

This invention relates to magnetic tape recorders of the type consisting of two separable units, one being a cassette containing the tape, the other being a unit which, more particularly, contains the tape drive mechanism and recording and/or playback heads.

The term "cassette" will hereinafter be used to denote the store containing the tape and "recording unit" to denote the other unit.

The tape contained in the cassette is an endless tape or a tape whose ends are wound respectively on a tape feed spool and on a tape take-up spool, said spools being contained in the cassette.

According to one aspect of the present invention, a magnetic tape recorder cassette has a cover for closing an opening in one edge, the cover being connected to the cassette by means whereby the cover can be moved from its closed position, as used during transportation or storage of the cassette, to an open position which is used during operation of the tape, and during which the cover is moved clear of the opening but remains attached to the cassette so that the cassette cover is captive.

The means connecting the cover to the cassette may comprise at least one groove and at least one peg which is held captive in the groove while being capable of sliding along the groove.

The cassette may be in the form of a flat case having an opening in a front edge, the said cover covering the front edge when it is in the closed position and covering the rear edge when it is in its open retracted position. The cover may have on opposed surfaces two pegs, facing one another and the cassette may afford two grooves, for example grooves extending along two adjacent edges of the cassette, in two opposite external surfaces, the said grooves extending over part of the periphery of the said surfaces, the pegs of the cover being held captive in the grooves while being capable of sliding along the grooves.

According to a further aspect of the present invention a magnetic tape recorder includes a cassette having for each of two spools, a brake unit capable of pivoting about an axis parallel to the axis of rotation of the spool, each brake unit comprising a spool brake shoe and an abutment arranged to ride up a cam surface, afforded by the recording unit, when the cassette is inserted in the recorder to retract the brake shoe to an inoperative position from a braking position against the action of a spring.

According to another aspect of the present invention a magnetic tape recorder has a capstan for driving the tape in either direction between a pair of spools for recording and/or reproducing, and means for keeping the tape in tension, and comprises a transmission from the capstan to each spool, which includes a slipping clutch tending to drive both spools in a direction to take up tape so that the friction clutches exert tension in opposite directions on the tape to maintain it in tension, that of the feed spool slipping more than that of the take-up spool. The transmission from the capstan to each slipping clutch may include a freewheel device, the freewheels being arranged so that one is engaged when the capstan rotates in one direction, and the other is engaged when the capstan rotates in the opposite direction, and the driven members of the freewheels are coupled so that whichever freewheel is engaged, will tend to drive each spool through its friction clutch so as to tend to take up tape.

The tension means may be driven from the capstan by means of a belt, while each freewheel may comprise rollers interposed between the driving and driven members so as to wedge and engage the freewheel in a driving direction and disengage in an over-running direction.

The present invention may be carried into practice in various ways but one embodiment will now be described by way of example with reference to the accompanying drawings, in which.

Figure 1:
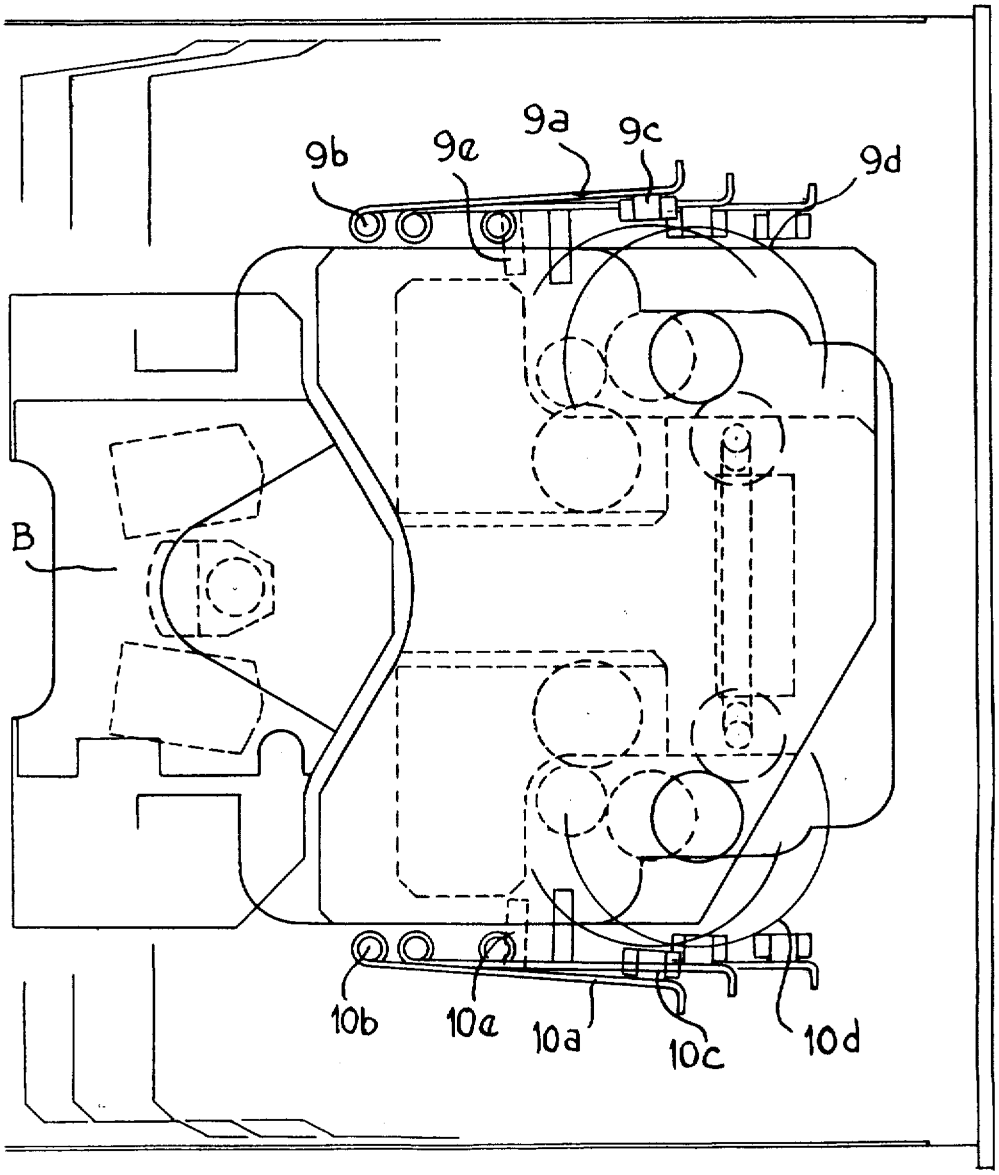
FIG. 1 is a diagrammatic view of a cassette tape recorder.

The diagram in FIG. 1 shows some of the elements of the capstan unit B of a recorder and some of the elements of a cassette A which slides into the recorder from the right as viewed in FIG. 1.

Figure 2:
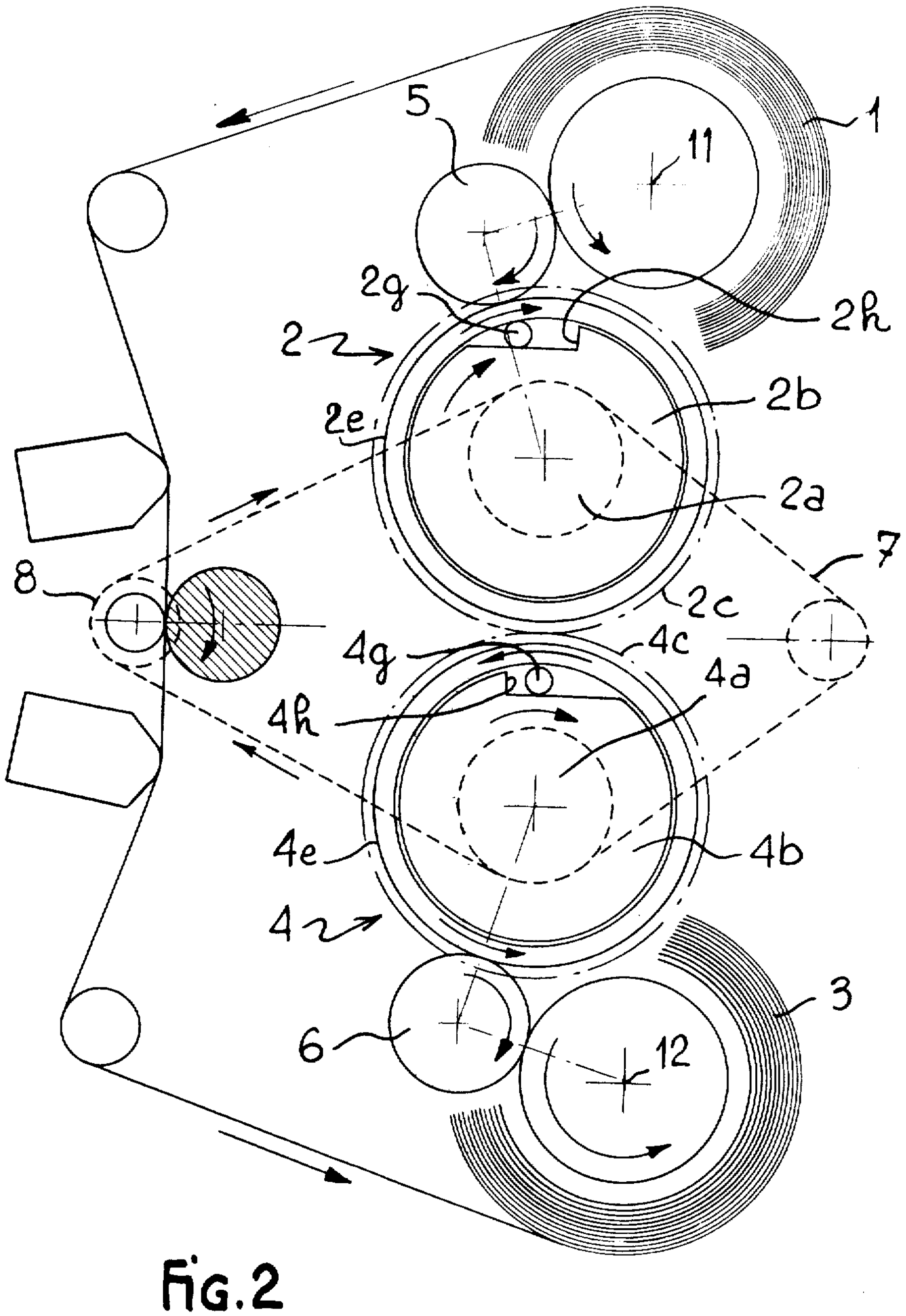
FIG. 2 shows diagrammatically the principle of the tensioning means for the tape used with the recorder of FIG. 1.
Figure 3:
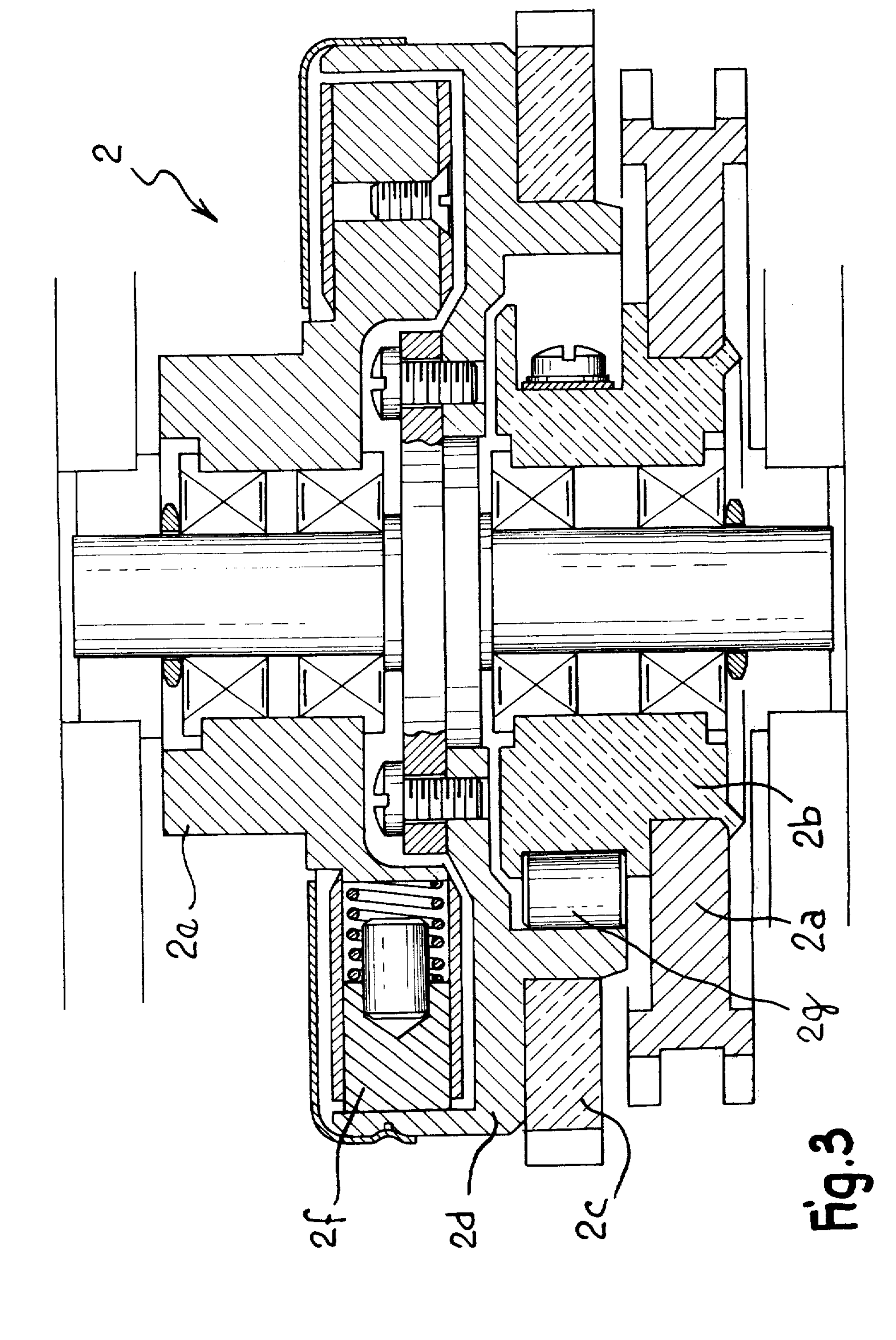
FIG. 3 is an axial section of a friction and freewheel unit of FIG. 2.
Figure 4:
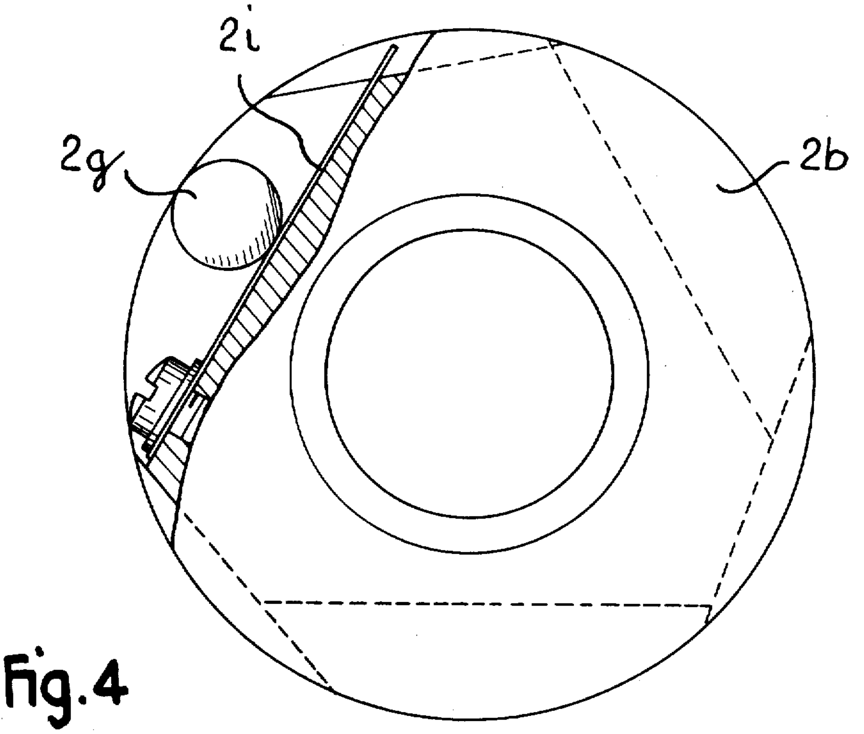
FIG. 4 is a detail of the freewheel unit shown in FIG. 3.

FIG. 2 is a diagram of tape tensioning means which, with the exception of tape spools 1 and 3, are mounted in the recorder unit, and which consist of a slipping and freewheel unit 2 for the feed spool 1 and a slipping and freewheel unit 4 for the take-up spool 3. The units 2 and 4 have the same construction and one 2 is shown in detail in FIG. 3. As shown in FIG. 2 the tensioning units are driven from the capstan by a belt 7 passing round the hub 8 of the capstan and round driving wheels 2*a* and 4*a* of the tensioning units so as to drive the latter in the same direction (clockwise as indicated by the arrows). As shown in FIG. 3 the wheel 2*a* is fixed to a freewheel hub 2*b* which imparts a unidirectional drive to a collar 2*d* and a toothed wheel 2*c* secured to the collar, through a freewheel comprising rollers 2*g* received in asymmetrical recesses 2*h* which wedge to provide a drive in one direction only. Preferably, as indicated diagrammatically in FIG. 4, leaf springs 2*i* act to maintain the required pressure on the freewheel rollers 2*g*.

The collar 2*d* is connected to a driven wheel 2*e* by means of a slipping clutch 2*f*. As shown diagrammatically in FIG. 2, the driven wheel 2*e* engages a roller 5 driving the spool 1 (whilst the corresponding driven wheel 4*e* engages a roller 6 driving the spool 3). In addition the toothed wheel 2*c* meshes with the corresponding wheel 4*c* so that they are constrained to rotate in opposite directions.

Thus in operation the transmission tends to rotate both tape spools in a direction to take up tape. Clearly this cannot occur without breaking the tape and the slipping clutches are designed to apply an appropriate light tension to the tape and then to slip. Thus as long as the tape is moving one or the other of the slipping clutches is continuously slipping, the amount of slip in the clutch associated with the take-up spool, if any, being much less than in the clutch associated with the payout or feed spool.

Thus the slipping clutches acting on the two spools apply opposite and substantially equal light tensions to the tape, and the travel of the tape is determined by the capstan, the take-up spool being frictionally driven to take up any slack in the tape leaving the capstan while the feed spool is frictionally braked to prevent any slack in the tape paid out to the capstan.

The arrows in FIG. 2 indicate the situation when the tape is travelling from the spool 1 to the spool 3. In this case the freewheel 2g is engaged so as to rotate the toothed wheel 2c in a clockwise direction. This constrains the toothed wheel 4c to rotate in an anti-clockwise direction, disengaging the freewheel 4g, so that the slipping clutch 4f tends to turn the driven wheel 4e also in an anti-clockwise direction, the roller 6 in a clockwise direction, and the spool 3 in an anti-clockwise direction so as to take up any slack fed out by the capstan. If the speed of the spool 3 tends to be too great, the slipping clutch 4f will slip slightly.

Meantime, the collar 2d is rotating in a clockwise direction so that the slipping clutch 2f is trying to turn the driven wheel 2e in a clockwise direction, the roller 5 in an anti-clockwise direction, and the spool 1 in a clockwise direction so as to tend to take up tape. In fact, however, tape is being drawn from this spool by the capstan (aided by the tension due to the take-up spool 3) and hence the slipping clutch 2f will slip and the spool 1 will turn anti-clockwise, the roller 5 clockwise, and the driven wheel 2e anti-clockwise, even though the toothed wheel 2c and collar 2d are turning in the opposite direction, namely clockwise.

Moreover it will be noted that, when the direction of rotation of the capstan is reversed, one freewheel disengages and the other engages so that the slipping clutches still tend to rotate the spools in the same direction. The operation is as before except that the tape travels in the opposite direction and the spools exchange their functions, the spool previously driven and serving as the take-up spool with little or no slip in its clutch becoming the braked feed spool with substantial slip in its clutch, and vice versa.

The invention is not limited to a specific choice for the required transmission between the tensioning unit and the corresponding spool, and such transmission may, for example, be in the form of a rubber roller intermediate a smooth roller of the tensioning unit and the hub of the spool or may be in the form of a gearwheel intermediate a gear of the tensioning unit and a gear connected to the spool hub, or by combinations of gearwheels and/or smooth rollers.

As indicated above, the tensioning means are mounted in the body of the recorder and are arranged so as to be brought into driving engagement with the tape spools in the cassette when the latter is inserted into the recorder, for example, bringing the hubs of the spools 1 and 3 into engagement with rollers such as 5 and 6.

Figure 5:
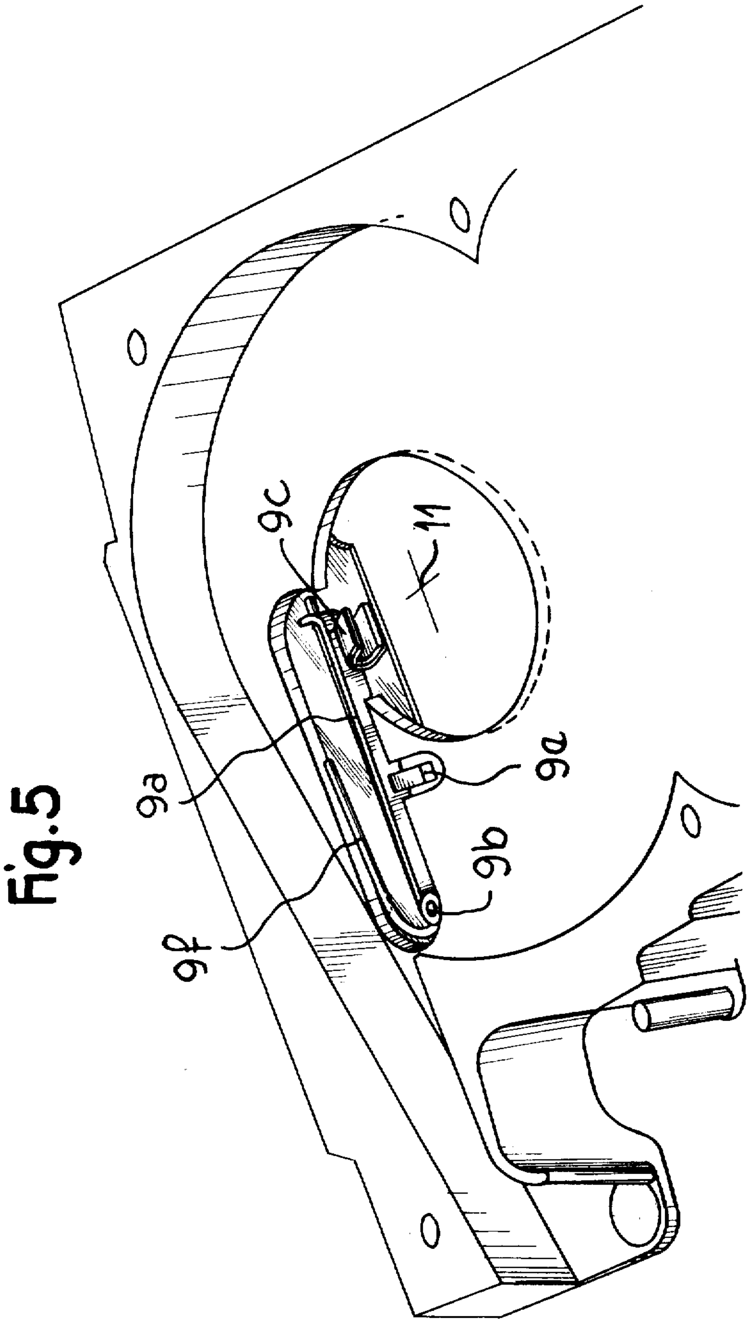
FIG. 5 is a perspective view showing the principle of a brake associated with one of the spools of the cassette.

For keeping the tape taut when the cassette is out of the recorder each spool is provided with a pivoting braking unit which comprises (FIGS. 1 and 5) a pivoting arm 9a (10a), the pivot axis 9b (10b) of which is parallel to the axis of rotation 11 (12) of the spool. This arm bears a brake shoe 9c (10c) adapted to come into braking contact with a disc 9d (10d) connected to the hub of the spool, and also bears a lateral finger 9e (10e) which rides up a surface of the recording unit when the cassette is put into position, so as to push the arm into a retracted position against the action of a spring 9f. Thus when the cassette is removed the spring biases the arm into its operating position to apply the brake. FIG. 1 shows the positions of the brake arms for two different positions of the cassette with respect to the recording unit, these positions corresponding respectively to the end of travel of the arms in one direction and the end of travel in the other direction.

Figure 9:
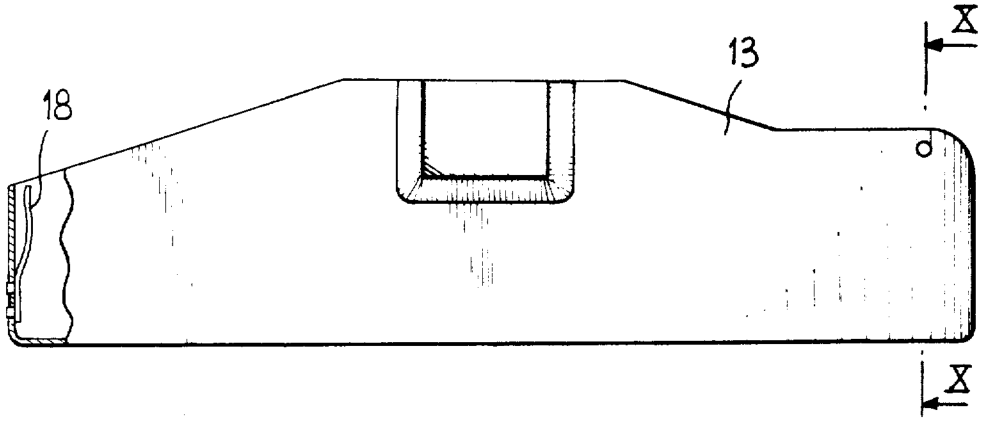
FIG. 9 is a view of the profile of the cover of the cassette.
Figure 10:
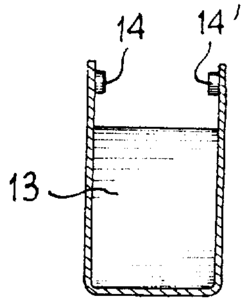
FIG. 10 is a transverse section of the cover of FIG. 9 on the line X—X of FIG. 9.

The cassette comprises a relatively flat case in which the two spools are mounted for rotation side by side. As will be apparent from FIG. 6 the case has an opening in one edge, which will be referred to as the front, to expose the tape to the capstan and recording and/or reproducing heads. This opening is provided with a cover 13 (FIGS. 9 and 10), which must be retracted clear of the opening when the cassette is mounted in the recording unit.

Figure 6:
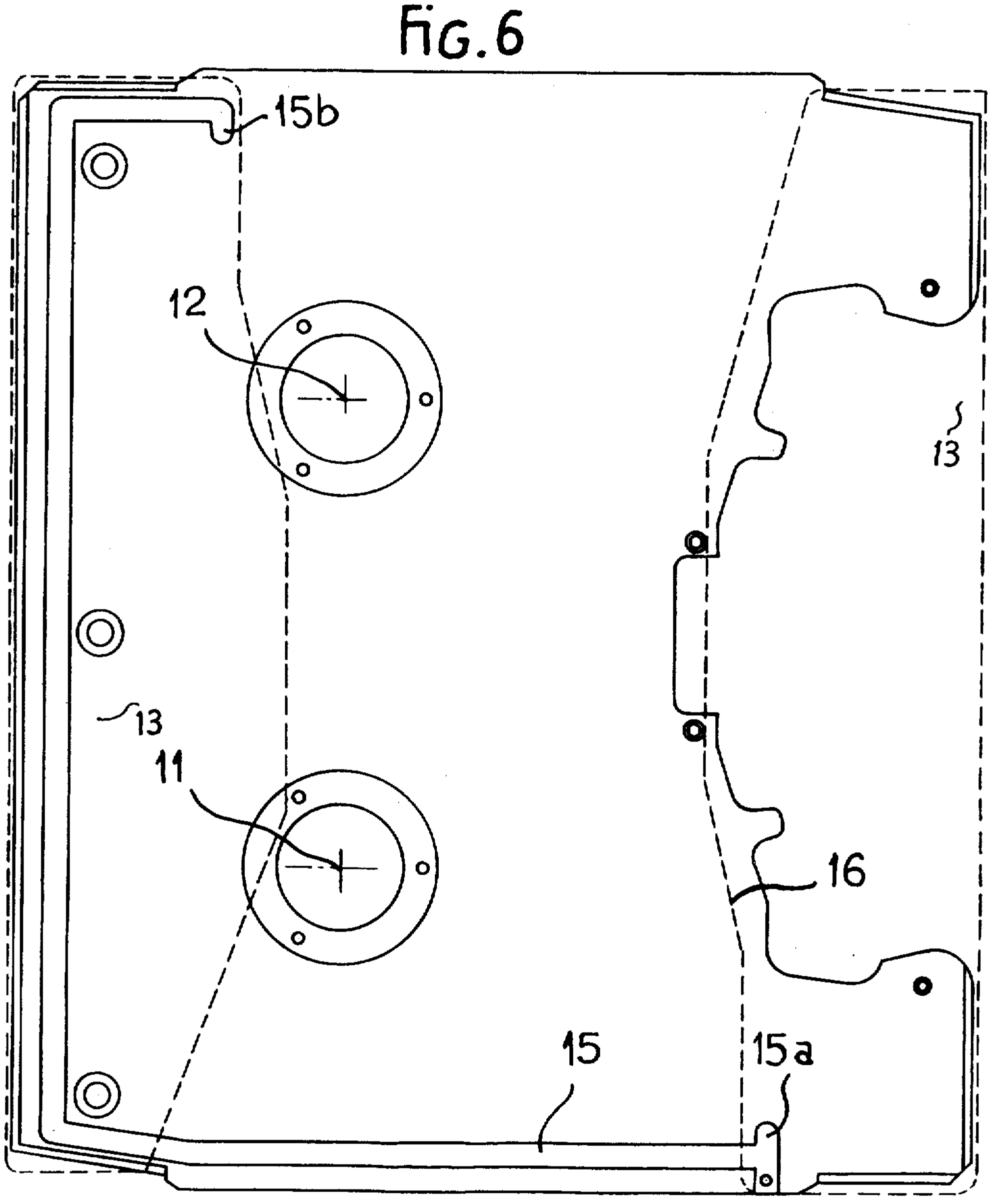
FIG. 6 is a plan view of the cassette.
Figure 7:
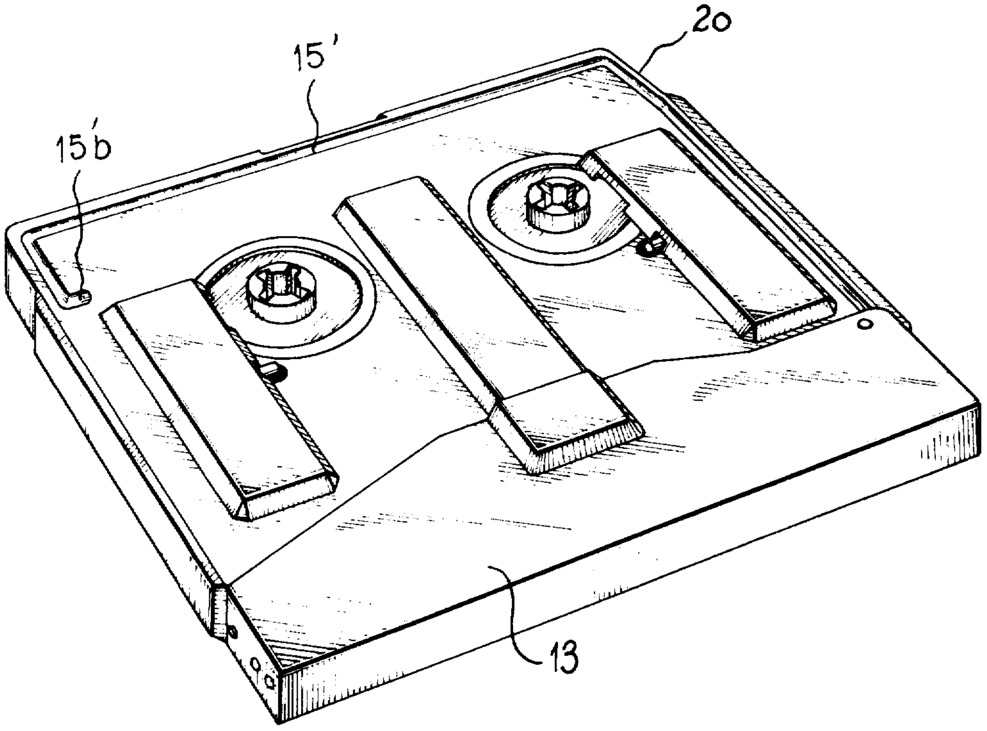
FIG. 7 is a perspective view showing the other face of the cassette, with the cover in the closed position.
Figure 8:
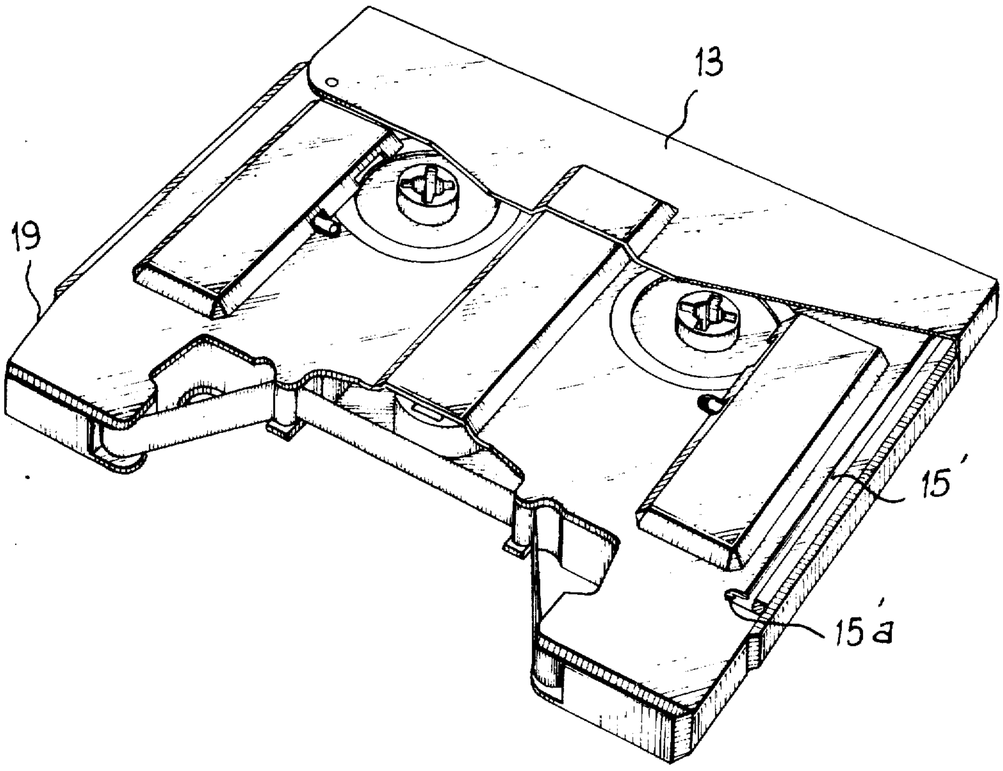
FIG. 8 is another perspective view of the cassette, similar to FIG. 7, but with the cover in the open position.

According to the invention, the hollow cover is made captive by providing it with two opposed pegs 14, 14' which are held captive in two grooves 15 (15') formed in the outer surfaces of the two walls 16 (16') forming the two major surfaces of the cassette. FIG. 6 shows only the surface 16 of the cassette with its groove 15 which runs along one of the side edges and the rear edge, with a return on the other side edge of the surface 16 of the cassette. The peg 14 is normally captive in the groove 15 but can slide along the groove, while the peg 14' co-operates similarly with a similar groove 15' in the opposite face of the case, (FIGS. 7 and 8).

Under these conditions, starting from a closed position in which the two pegs are at the end of the grooves 15a (15'a), the cover 13 can be brought into a position in which it covers the rear edge of the cassette, the pegs then being situated in the other ends 15b, 15'b of the grooves, the cover always remaining attached to the cassette when passing from the closed position to the open position, and always remaining attached to the cassette.

FIG. 6 shows the cover in broken lines (on the right in the drawing) in the closed position, in which it covers the opening in the front of the cassette, with a wedging action and (in the left of the Figure) in the retracted position in which it covers the rear edge of the cassette with a wedging action.

The wedging is obtained by any appropriate means, for example, by means of a blade spring 18 (FIG. 9) fixed to the inside of the wall of the cover remote from the pegs 14 and 14'. When the pegs 14, 14' are in the ends 15a, 15'a of the grooves, the blade spring engages the front portion 19 (FIG. 8) of that side edge of the cassette which contains the ends 15b, 15'b and when the pegs are in the ends 15b, 15'b of the grooves, the blade spring presses against the rear part 20 (FIG. 7) of the side edge of the cassette which contains the ends 15a, 15'a, of the grooves.

Those versed in the art will be able to provide variants of the above-described recorder without departing from the scope of the invention and whether or not complying with the details of the embodiment shown in the drawings, which also form part of the invention.

A magnetic recorder of this kind is intended more particularly to be used on aircraft for the conventional applications of magnetic recorders used on aeroplanes. In one such example the tape is about ½ inch wide, accommodating 16 tracks, while the overall dimensions of the cassette are approximately 1 × 7½ × 6½ inches.

What we claim as our invention and desire to secure by Letters Patent of the United States is:

1. A magnetic tape cassette comprising:
   a. a relatively flat case having two parallel spaced walls, front and rear edges between said walls, and an opening in one of said edges,
   b. a cover adapted to fit over a portion of said walls adjacent to said opening so as to close said opening, and
   c. means interconnecting said cover and case permitting said cover to be removed from said opening to expose the latter without detaching said cover from said case, said means including a groove in one of said cover and case and a peg in the other of said cover and case, said peg being captive in and slidable along said groove.

2. A magnetic tape cassette as defined in claim 1 wherein said walls are generally rectangular, said opening is in the front edge of said case, and said cover is adapted to fit over portion port of said walls adjacent the rear edge of said case when said opening is uncovered.

3. A magnetic tape cassette as defined in claim 1 including a groove in the outer surface of each of said walls, said grooves extending along a portion of the peripheries of their respective walls, and said cover carrying two pegs facing each other, said pegs being slidably arranged and held captive within said grooves, respectively.

4. A magnetic tape cassette as defined in claim 3 wherein said case is generally rectangular, and each of said grooves extends along two adjacent edges of said case.

* * * * *